(12) United States Patent
Cong-Yun et al.

(10) Patent No.: US 6,432,901 B2
(45) Date of Patent: Aug. 13, 2002

(54) BLEACH CATALYSTS

(75) Inventors: Dai Cong-Yun; Dao-Li Deng, both of Shanghai (CN); Ronald Hage, Vlaardingen (NL); Chang-Qing Ye; Hong Zeng, both of Shanghai (CN)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 24 days.

(21) Appl. No.: 09/740,122

(22) Filed: Dec. 19, 2000

(30) Foreign Application Priority Data

Dec. 22, 1999 (GB) ............................... 9930422

(51) Int. Cl.⁷ .............................. C11D 3/20; C11D 3/26; C11D 3/395
(52) U.S. Cl. ...................... 510/376; 510/302; 510/303; 510/309; 510/312; 510/314; 510/372; 510/508
(58) Field of Search ................. 510/302, 303, 510/309, 312, 314, 372, 376, 508; 8/111, 137

(56) References Cited

U.S. PATENT DOCUMENTS

| | | | | |
|---|---|---|---|---|
| 4,631,141 A | | 12/1986 | Baxter | 252/95 |
| 4,978,763 A | * | 12/1990 | Rocklage et al. | 556/50 |
| 5,102,555 A | * | 4/1992 | Kessler | 210/697 |
| 6,139,603 A | | 10/2000 | Boisselier-Cocolios et al. | 95/44 |

FOREIGN PATENT DOCUMENTS

| | | |
|---|---|---|
| EP | 0 458 397 | 11/1991 |
| EP | 0 549 271 | 6/1993 |
| EP | 0 549 272 | 6/1993 |
| WO | 94/15925 | 7/1994 |
| WO | 97/36991 | 10/1997 |
| WO | 97/44520 | 11/1997 |
| WO | 99/65905 | 12/1999 |

OTHER PUBLICATIONS

International Search Report (Dec. 2000).
GB Search Report (Feb. 2000).

* cited by examiner

*Primary Examiner*—Gregory Delcotto
(74) *Attorney, Agent, or Firm*—Milton L. Honig

(57) ABSTRACT

A bleach catalyst system comprising in combination, a macrocyclic organic ligand of formula (I):

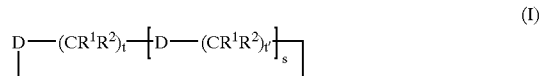

wherein $R^1$ and $R^2$ can each independently be absent, H, alkyl or aryl, optionally substituted; t and t' are each independent integers from 2–3; each D can independently be N, $NR^3$, $PR^3$, O or S, wherein each $R^3$ is independently H, alkyl or aryl, optionally substituted by one or more suitable substituents such as $C_{1-4}$ alkyl groups, or is a bridging group such as $C_{1-6}$ alkylene, either to another $R^3$ group in the same macrocycle or to another independently defined macrocycle or to another independently defined macrocyclic ligand of formula (I), wherein any bridging group optionally contains an optionally substituted heteroatom such as nitrogen; and s is an integer from 2–5; and a water-insoluble manganese compound.

14 Claims, No Drawings

BLEACH CATALYSTS

This invention relates to activation of bleaches employing peroxy compounds, including hydrogen peroxide or a hydrogen peroxide adduct, which liberate hydrogen peroxide in aqueous solution, as well as peroxy acids; to compounds that activate or catalyse peroxy compounds; to bleach compositions including detergent bleach compositions which contain a catalyst for peroxy compounds; and to processes for bleaching and/or washing of substrates employing the aforementioned types of compositions.

In particular, the present invention is concerned with the novel use of transition metal compounds as improved catalyst for the bleach activation of peroxy compound bleaches.

Peroxide bleaching agents for use in laundering have been known for many years. Such agents are effective in removing stains, such as tea, fruit and wine stains, from clothing at or near boiling temperatures. The efficacy of peroxide bleaching agents drops off sharply at temperatures below 60° C.

Many transition metal ions catalyse the decomposition of $H_2O_2$ and $H_2O_2$-liberating percompounds, such as sodium perborate. In practice, transition metal salts together with a chelating agent are used to activate peroxide compounds so as to make them usable for satisfactory bleaching at lower temperatures.

The catalysts of the invention may also be applied in the peroxide oxidation of a broad range of organic molecules such as olefins, alcohols, aromatic ethers, sulphoxides and various dyes, and also for inhibiting dye transfer in the laundering of fabrics.

EP-A-0 458 397 discloses transition metal bleach catalysts based on a non-cobalt metal and preferably comprises a manganese complex of formula (A):

$$[L_nMn_mX_p]^zY_q \quad (A)$$

in which Mn is manganese, which can be either in the II, III, IV or V oxidation state, or mixtures thereof and wherein n and m are independent integers from 1–4; X represents a co-ordinating or bridging species, such as $H_2O$, $OH^-$, $O^{2-}$, $S^{2-}$, $N^{3-}$, $HOO^-$, $O_2^{2-}$, $O_2^{1-}$, $R-COO^-$, with R being H, alkyl, aryl, optionally substituted, $NR_3$ with R being H, alkyl, aryl, optionally substituted, $Cl^-$, $SCN^-$, $N_3^-$ etc. or a combination thereof; p is an integer from 0–12, preferably from 3–6; Y is a counter-ion, the type of which is dependent on the charge z of the complex; z denotes the charge of the complex and is an integer which can be positive, zero or negative. If z is positive, Y is an anion, such as $Cl^-$, $Br^-$, $I^-$, $NO_3^-$, $ClO_4^-$, $NCS^-$, $PF_6^-$, $RSO_4^-$, $OAc^-$, $BPh_4^-$, $CF_3SO_3^-$, $RSO_3^-$, $RSO_4^-$ etc; if z is negative, Y is a cation, such as an alkali metal, alkaline earth metal or (alkyl) ammonium cation etc; q=z/[charge Y]: and L is a ligand being a macrocyclic organic molecule of general formula (I):

(I)

wherein $R^1$ and $R^2$ can each be absent, H, alkyl, aryl, optionally substituted, each D can be independently N, NR, PR, O or S, wherein R is H, alkyl, aryl, optionally substituted. If D=N, one of the hetero-carbon bonds attached thereto will be unsaturated, giving rise to a $-N=CR^1$- fragment, t and t' are each independently 2 or 3, and s=2,3,4 or 5. These complexes are highly effective bleach catalysts. One preferred commercial example of a particular manganese complex of formula (A) is the complex of manganese in the (IV) oxidation state with 1,4,7-trimethyl-1,4,7-triazacyclononane (hereinafter referred to by the abbreviation $Me_3TACN$), namely $[Mn^{IV}(\mu-O)_6 (Me_3-TACN)_2]$—$(PF_6)_2$. The bleach catalysis activity of the free (uncomplexed) ligands of formula (I) is disclosed in EP-A-0 549 271, and for the same ligands in combination with water-soluble manganese salts is disclosed in EP-A-0 549 272.

However, if the bleaching activity of this class of materials could be boosted, they could be used at lower levels to provide a significant reduction in cost.

This problem has now been solved by formulating compositions comprising the same class of ligand as in formula (A), together with a water-insoluble compound of manganese.

The catalysts according to the present invention are also useful as oxidation catalyst systems and therefore find application in waste water treatment and in the general chemical industry.

Thus, the present invention now provides a bleach catalyst system comprising in combination, a macrocyclic organic ligand of formula (I):

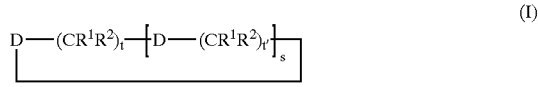

(I)

wherein $R^1$ and $R^2$ can each independently be absent, H, alkyl or aryl, optionally substituted; t and t' are each independent integers from 2–3; each D can independently be N, $NR^3$, $PR^3$, O or S, wherein each $R^3$ is independently H, alkyl or aryl, optionally substituted by one or more suitable substituents such as $C_{1-4}$ alkyl groups, or is a bridging group such as $C_{1-6}$ alkylene, either to another $R^3$ group in the same macrocycle or to another independently defined macrocyclic ligand of formula (I), wherein any bridging group optionally contains an optionally substituted heteroatom such as nitrogen; and s is an integer from 2–5; and a water-insoluble manganese compound.

The Ligand

In formula (I) $R^1$ and $R^2$ are preferably each zero, H, alkyl or aryl, optionally substituted; D and D' are preferably each independently N, NR, PR, O or S, wherein R is H, alkyl or aryl, optionally substituted: t and t' are each independently integers from 2–3; s is an integer from 2–4, and n=m=2. Especially preferred is when D is NR and t and t' are 2 or 3, in particular when s is also 2. In the latter case, it is also most preferred for t and t' both to be 2.

In the case of bridging by $C_{1-6}$ alkylene groups between $R^3$ groups of two or more ligands, preferably only two ligands are so bridged. One preferred bridged ligand of formula (I) is:

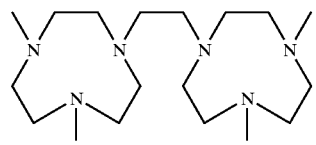

Other preferred sub-classes of the ligands of formula (I) are those in which D or D' is NH or NR; t and t' are 2 or 3, s=2, and $R^1=R^2=H$, more preferably, wherein D or $D^1$ is $NCH_3$ and t, t'=2, $Me_3$—TACN is especially preferred.

Yet other preferred ligands are those stated in EP-A-0 458 397 as preferred.

Ligands of formula (I) may be prepared by any of the methods disclosed in EP-A-0 458 397.

The Manganese Compound

The term "water-insoluble manganese compound" as used herein, is intended to encompass manganese compounds which are generally considered truly water-insoluble as well as sparingly-soluble manganese compounds. Of course, no manganese compound has absolutely zero solubility. Thus, preferably, the term "water-insoluble" as used in reference to the manganese compound, preferably means that this compound has a solubility no more than 10 g/l, preferably no more than 5 g/l, still more preferably, no more than 2 g/l at 25° C.

Typical such compounds include those with hydr(oxide), carbonate, oxalate, sulphide and/or phosphate anions ("water-insoluble manganese compound" includes mixtures of two or more different such compounds).

Especially preferred are manganese oxides, for example, $Mn_2O_3$, $Mn_3O_4$ and/or $MnO_2$.

Any of the water-insoluble manganese compounds may be in any appropriate oxidation state for example the II, III or IV oxidation state.

The most preferred water-insoluble manganese compound is manganese dioxide. This material may exist in various forms and oxidation states. The term "manganese dioxide" as used herein is intended to cover any manganese dioxide material in one or more of these oxidation states and in pure or impure form. The different forms and oxidation states of manganese dioxide are disclosed in Gmelins Handbuch der anorganischen Chemie, System-Nummer 56, Teil C1, pages 127–156 (1973).

Generally speaking, the weight ratio of the ligand of formula (I) to the manganese compound is from 1:0.32 to 1:160, more preferably from 1:1 to 1:50, yet more preferably, from 1:3 to 1:16.

Compositions

The invention further extends to a bleaching composition comprising a catalyst system according to any preceding claim and a peroxygen bleach or peroxygen bleach system. Such peroxygen bleaches or bleach systems are preferably bleaches including hydrogen peroxide, hydrogen peroxide-liberating or -generating compounds, peroxyacids and their salts, and peroxyacid bleach precursors and mixtures thereof.

Another aspect of the present invention provides a bleaching or cleaning process employing a bleaching composition according to the invention as defined above. This process comprises treating a substrate to be bleached, with an aqueous bleaching solution or dispersion containing set composition, wherein manganese is present expressed in terms of parts per million (ppm) of manganese in the aqueous bleaching solution, will normally range from 0.001 ppm to 100 ppm, preferably from 0.01 ppm to 20 ppm, most preferably from 0.1 ppm to 10 ppm. Higher levels may be desired and applied in industrial bleaching processes, such as textile and paper pulp-bleaching. The lower range levels are primarily destined and preferably used in domestic laundry operations.

As indicated above, the improved bleaching composition has particular application in detergent formulations to form a new and improved detergent bleach composition within the purview of the invention, comprising said peroxy compounds bleach, the catalyst system according to the invention, a surface-active material, and usually also detergency builders and other known ingredients of such formulations, as well as in the industrial bleaching of yarns, textiles, paper, woodpulp and the like.

The catalyst system according to the invention will be present in the detergent formulations in amounts so as to provide the required level in the wash liquor. When the dosage of the detergent bleach composition is relatively low, e.g. about 1 and 2 g/l by consumers in Japan and the USA, respectively, the Mn content in the formulation is 0.0025 to 0.5%, preferably 0.003 to 0.17%. At higher product dosage as used e.g. by European consumers, the Mn content in the formulation is 0.0005 to 0.1%, preferably from 0.005 to 0.05%.

Compositions comprising a peroxy compound bleach and the catalyst system of the invention are effective over a wide pH range of between 7 and 13, with optimal pH range lying between 8 and 11.

The peroxy compound bleaches which can be utilised in the present invention include hydrogen peroxide, hydrogen peroxide-liberating compounds, hydrogen peroxide-generating systems, peroxyacids and their salts, and peroxyacid bleach precursor systems and mixtures thereof.

Hydrogen peroxide sources are well known in the art. They include the alkali metal peroxides, organic peroxide bleaching compounds such as urea peroxide, and inorganic persalt bleaching compounds, such as the alkali metal perborates, percarbonates, perphosphates and persulphates. Mixtures of two or more of such compounds may also be suitable. Particularly preferred are sodium percarbonate and sodium perborate end, especially, sodium perborate monohydrate. Sodium perborate monohydrate is preferred to tetrahydrate because of its excellent storage stability while also dissolving very quickly in aqueous bleaching solutions. Sodium percarbonate may be preferred for environmental reasons. These bleaching compounds may be utilised alone or in conjunction with a peroxyacid bleach precursor. Use of this latter may be of advantage for improving the overall whiteness appearance of white fabrics as well as for hygiene purposes.

Peroxyacid bleach precursors are known and amply described in literature, such as in the GB Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412, 934 and 4,675,393.

Another useful class of peroxyacid bleach precursors is that of the quaternary ammonium substituted peroxyacid precursors as disclosed in U.S. Pat. Nos. 4,751,015 and 4,397,757, in EP-A-284,292, EP-A-331,229 and EP-A-0303520. Examples of peroxyacid bleach precursors of this class are:

2-(N,N,N-trimethyl ammonium) ethyl-4-sulphophenyl carbonate—(SPCC);
N-octyl,N,N,-dimethyl-N10-carbophenoxy decyl ammonium chloride—(ODC);
3-(N,N,N-trimethyl ammonium) propyl sodium-4-sulphophenyl carboxylate; and
N,N,N-trimethyl ammonium toluyloxy benzene sulphonate.

Of the above classes of bleach precursors, the preferred classes are the esters, including acyl phenol sulphonates and acyl alkyl phenol sulphonates; acyl-amides; and the quaternary ammonium substituted peroxyacid precursors.

Highly preferred activators include sodium-4-benzoyloxy benzene sulphonate; N,N,N'-tetraacetyl ethylene diamine; sodium-1-methyl-2-benzoyloxy benzene-4-sulphonate; sodium-4-methyl-3-benzoyloxy benzoate; SPCC; trimethyl ammonium toluyloxy benzene sulphonate; sodium nonanoyloxybenzene sulphonate; sodium 3,5,5,-trimethyl hexanoyloxybenzene sulphonate; glucose pentaacetate and tetraacetyl xylose.

Organic peroxyacids are also suitable as the peroxy compound. Such materials normally have a general formula:

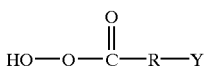

wherein R is an alkylene or substituted alkylene group containing from 1 to about 22 carbon atoms or a phenylene or substituted phenylene group, and Y is hydrogen, halogen, alkyl, aryl or

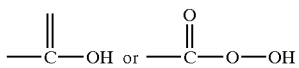

The organic peroxy acids usable in the present invention can contain either or two peroxy groups and can be either aliphatic or aromatic. When the organic peroxy acid is aliphatic, the unsubstituted acid has the general formula:

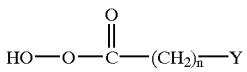

where Y can be, for example, H, $CH_3$, $CH_2Cl$, COOOH; and n is an integer from 1 to 20.

When the organic peroxy acid is aromatic, the unsubstituted acid has the general formula:

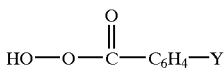

wherein Y is hydrogen, alkyl, alkylhalogen, halogen or COOH or COOOH.

Typical monoperoxy acids useful herein include alkyl peroxy acids and aryl peroxy acids such as:
 (i) peroxybenzoic acid and ring-substituted peroxybenzoic acids, e.g. peroxy-α-naphthoic acid;
 (ii) aliphatic, substituted aliphatic and arylalkyl monoperoxy acids, e.g. peroxylauric acid, peroxystearic acid, and N,N-phthaloylaminoperoxycaproic acid.

Typical diperoxy acids useful herein include alkyl diperoxy acids and aryldiperoxy acids, such as:
 (iii) 1,12-diperoxydodecanedioic acid;
 (iv) 1,9-diperoxyazelaic acid;
 (v) diperoxybrassylic acid; diperoxysebacic acid and diperoxyisophthalic acid;
 (vi) 2-decydiperoxybutane-1,4-dioic acid;
 (vii) 4,4'-sulfonylblsperoxybenzoic acid.

An inorganic peroxyacid salt usable herein is, for example, potassium monpersulphate.

A detergent bleach composition of the invention can be formulated by combining effective amounts of the components. The term "effective amounts" as used herein means that the ingredients are present in quantities such that each of them is operative for its intended purpose when the resulting mixture is combined with water to form an aqueous medium which can be used to wash and clean clothes, fabrics and other articles.

In particular, the detergent bleach composition can be formulated to contain, for example, form about 2% to 30% by weight, preferably from 5 to 25% by weight, of a peroxide compound.

Peroxyacids may be utilised in somewhat lower amounts, for example from 1% to about 15% by weight preferably from 2% to 10% by weight.

Peroxyacid precursors may be utilised in combination with a peroxide compound in approximately the same level as peroxyacids, i.e. 1% to 15%, preferably from 2% to 10% by weight.

The catalyst system of the invention can also catalyse bleaching by atmospheric oxygen, in water alone or in a composition containing one or more other components such as surfactant, builders and the like, without an additional bleach or bleach system. This air-bleaching use constitutes another aspect of the invention.

The manganese complex catalyst will be present in such formulations in amounts so as to provide the required level of Mn in the wash liquor. Normally, an amount of manganese complex catalyst is incorporated in the formulation which corresponds to a Mn content of from 0.0005% to about 0.5% by weight, preferably 0.001% to 0.25% by weight.

The bleach catalyst of the invention is compatible with substantially any known and common surface-active agents and detergency builder materials.

The surface-active material may be naturally derived, such as soap, or a synthetic material selected from anionic, nonionic, amphoteric, zwitterionic, cationic actives and mixtures thereof. Many suitable actives are commercially available and are described in literature, for example in "Surface Active Agents and Detergents". Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl groups containing from about 8 to about 22 carbon atoms, the term alkyl being used to include the alkyl portion of higher aryl groups.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralised with sodium hydroxide; sodium and ammonium salts of fatty acid amides of methyl taurine; alkane monosulphonates such as those derived by reacting alpha-olefins ($C_8$–$C_{20}$) with sodium bisulphite and those derived by reacting paraffin with $SO_2$ and $Cl_2$ and then hydrolysing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alpha-olefins, with $SO_3$ and then neutralising and hydrolysing the reaction product. The preferred anionic detergent compounds are sodium ($C_{11}$–$C_{15}$) alkylbenzene sulphonates, sodium ($C_{16}$–$C_{18}$) alkyl sulphates and sodium ($C_{16}$–$C_{18}$) alkyl ether sulphates.

Examples of suitable nonionic surface-active compounds which may be used, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 3–30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used, are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

The detergent compositions of the invention will normally also contain a detergency builder. Builder materials may be selected from 1) calcium sequestrant materials, 2) precipitating materials, 3) calcium ion-exchange materials and 4) mixtures thereof.

Examples of calcium sequestrant builder materials include alkali polyphosphates, such as sodium tripolyphosphate; nitrilotriacetic acid and its water-soluble salts; the alkali metal salts of ether polycarboxylates. Such as carboxymethyloxy succinic acid, oxydisuccinic acid, mellitic acid; ethylene diamine tetraacetic acid; benzene polycarboxylic acids; citric acid; and polyacetal carboxylates as disclosed in U.S. Pat. Nos. 4,144,226 and 4,146,495.

Examples of precipitating builder materials include sodium orthophosphate, sodium carbonate and sodium carbonate/calcite.

Examples of calcium ion-exchange builder materials include the various types of water-insoluble crystalline or amorphous aluminosilicates, of which zeolites are the best known representatives.

In particular, the compositions of the invention may contain any one of the organic or inorganic builder materials, such as sodium or potassium tripolyphosphate, sodium or potassium pyrophosphate, sodium or potassium orthophosphate, sodium carbonate or sodium carbonate/calcite mixtures, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as al-kanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, other stabilizers, such as ethylene diamine tetraacetic acid and the phosphonic acid derivatives (i.e. Dequest® types), fabric softening agents, inorganic salts, such as sodium sulphate, and, usually present in very small amounts, fluorescent agents, perfumes, enzymes, such as proteases, cellulases, lipases, amylases and oxidases, germicides and colourants.

Another optional but highly desirable additive ingredient with multi-functional characteristics in detergent compositions is from 0.1% to about 3% by weight of a polymeric material having a molecular weight of from 1,000 to 2,000,000 and which can be a homo- or co-polymer of acrylic acid, maleic acid, or salt or anhydride thereof, vinyl pyrrolidone, methyl- or ethyl-vinyl ethers, and other polymerizable vinyl monomers. Preferred examples of such polymeric materials are polyacrylic acid or polyacrylate; polymaleic acid/acrylic acid copolymer; 70:30 acrylic acid/hydroxyethyl maleate copolymer; 1:1 styrene/maleic acid copolymer: isobutylene/maleic acid and diisobutylene/maleic acid copolymers; methyl- and ethyl-vinylether/maleic acid copolymers; ethylene/maleic acid copolymer; polyvinyl pyrrolidone; and vinyl pyrrolidone/maleic acid copolymer.

Detergent bleach compositions of the invention, when formulated as free-flowing particles, e.g. in powdered or granulated form, can be produced by any of the conventional techniques employed in the manufacture of detergent compositions, for instance by slurry-making, followed by spray-drying to form a detergent base powder to which the heat-sensitive ingredients including the peroxy compound bleach and optionally some other ingredients as desired, and the bleach catalyst, can be added as dry substances.

It will be appreciated, however, that the detergent base powder compositions, to which the bleach catalyst is added, can itself be made in a variety of other ways, such as the so-called part-part processing, non-tower route processing, dry-mixing, agglomeration, granulation, extrusion, compacting and densifying processes etc., such ways being well known to those skilled in the art and not forming the essential part of the present invention.

Alternatively, the bleach catalyst can be added separately to a wash/bleach water containing the peroxy compound bleaching agent.

In that case, the bleach catalyst is presented as a detergent additive product. Such additive products are intended to supplement or boost the performance of conventional detergent compositions and may contain any of the components of such compositions, although they will not comprise all of the components as present in a fully formulated detergent composition. Additive products in accordance with this aspect of the invention will normally be added to an aqueous liquor containing a source of (alkaline) hydrogen peroxide, although in certain circumstances the additive product may be used as separate treatment in a pre-wash or in the rinse.

Additive products in accordance with this aspect of the invention may comprise the compound alone or, preferably, in combination with a carrier, such as a compatible aqueous or non-aqueous liquid medium or a particulate substrate or a flexible non-particulate substrate.

Examples of compatible particulate substrates include inert materials, such as clays and other aluminosilicates, including zeolites, both natural and synthetic of origin. Other compatible particulate carrier materials include hydratable inorganic salts, such as carbonates and sulphates.

The instant bleach catalyst can also be formulated in detergent bleach compositions of other product forms, such as flakes, tablets, bars and liquids, particularly non-aqueous liquid detergent compositions.

Such non-aqueous liquid detergent compositions in which the instant bleach catalyst can be incorporated are known in the art and various formulations have been proposed, e.g. in U.S. Pat. Nos. 2,864,770: 3,368,977; 4,772,412; GB Patents 1,205,711; 1,370,377; 2,194,536; DE-A-2,233,771 and EP-A-0,028,849.

These are compositions which normally comprise a non-aqueous liquid medium, with or without a solid phase dispersed therein. The non-aqueous liquid medium may be a liquid surfactant, preferably a liquid nonionic surfactant; a non-polar liquid medium, e.g. liquid paraffin; a polar solvent, e.g. polyols, such as glycerol, sorbitol, ethylene glycol, optionally combined with low-molecular monohydric alcohols, e.g. ethanol or isopropanol; or mixtures thereof.

The solid phase can be builders, alkalis, abrasives, polymers, clays, other solid ionic surfactants, bleaches, fluorescent agents and other usual solid detergent ingredients.

The invention will now be further illustrated by way of the following non-limiting examples.

EXAMPLES 1–6

Experimental Evaluation of Catalyst Systems

A Macbeth COLOUR-EYE 7000A spectrophotometer was used for the measurement of reflectance with large area of view (25.4 mm$^2$). All reagents were used as received.

The bleach procedure was proceeded as the following manner. A 250 ml of beaker was charged with 100 ml of pH 10 buffer and then moved to a thermostat (40° C.). As soon as the temperature rose to 40° C. in the beaker, 87 μl of 31.15% $H_2O_2$, then catalyst and two pieces of BC-1 (4.5 mm×4.5 mm) were added in the beaker. After magnetic stirring for 30 minutes at 40° C., the tea stained clothes (BC-1) were taken out, washed with demineralised water, and dried by dryer. The reflectance of bleached BC-1 cloth was measured on Color Eye 7000A Spectrophotometer.

Results

The catalytic bleach activity may be evaluated by the measurement of reflectance (at 460 nm) of tea stained BC-1 cloth before and after bleach test. ΔR is equal to the difference of reflectance between the sample and control. A lower ΔR value means a higher catalytic bleach activity.

ΔR=reflectance of sample−reflectance of original BC-1 cloth

The enhancement of bleach activity for manganese dioxide is summarised in Table 1.

TABLE 1

Influence of the amount of $MnO_2$ on bleach activity

| Example | Catalyst | Mole Ratio (Mn:Me$_3$TACN) | ΔR |
|---|---|---|---|
| A | $H_2O_2$[a] | | 5.4 |
| B | Me$_3$TACN[b] | | 10.9 |
| C | $MnSO_4$ + Me$_3$TACN | 0.5:1 | 9.3 |
| D | $MnSO_4$ + Me$_3$TACN | 1:1 | 8.3 |

TABLE 1-continued

Influence of the amount of $MnO_2$ on bleach activity

| Example | Catalyst | Mole Ratio (Mn:Me$_3$TACN) | ΔR |
|---|---|---|---|
| E | $MnCl_2$ + Me$_3$TACN | 0.5:1 | 10.3 |
| F | $MnCl_2$ + Me$_3$TACN | 1:1 | 8.7 |
| G | $MnCl_2$ + Me$_3$TACN | 25:1 | 3.6 |
| H | $Mn(NO_3)_2$ + Me$_3$TACN | 1:1 | 8.0 |
| I | $Mn(NO_3)_2$ + Me$_3$TACN | 25:1 | −3.9 |
| J | $Mn(OAc)_2$ + Me$_3$TACN | 1:1 | 7.2 |
| K | $Mn(OAc)_2$ + Me$_3$TACN | 25:1 | −1.9 |
| 1 | $MnO_2$ + Me$_3$TACN | 10:1 | 12.4 |
| 2 | $MnO_2$ + Me$_3$TACN | 25:1 | 14.2 |
| 3 | $MnO_2$ + Me$_3$TACN | 39:1 | 14.2 |
| 4 | $MnO_2$ + Me$_3$TACN | 46:1 | 13.0 |
| 5 | $MnO_2$ + Me$_3$TACN | 320:1 | 12.0 |
| 6 | $Mn_2O_3$ + Me$_3$TACN | 30:1 | 11.0 |

[a]Concentration 8.6 × 10$^{-3}$ mol/l
[b]Concentration 5.0 × 10$^{-6}$ mol/l

The addition of $MnO_2$ generally causes the enhancement of bleach activity of Me$_3$TACN, but the extent of enhancement greatly depends on the amount of manganese dioxide added in bleach experiment. The bleach activity reaches the highest value, when the ratio of Me$_3$TACN to $MnO_2$ ranges from 1:25 to 1:39. More $MnO_2$ results in the decline of bleach activity, but it still reveals a significantly higher bleach activity than Me$_3$TACN alone.

Table 1 also shows that soluble manganese salts such as $MnSO_4$, $MnCl_2$, $Mn(NO_3)_2$ and $Mn(OAc)_2$ in 1:1 ratio reduce the bleach activity of Me$_3$TACN. When $MnCl_2$, $Mn(NO_3)_2$ and $Mn(OAc)_2$ are used, the bleach activity dramatically decreases. These experimental data indicate that soluble manganese salts deteriorate the bleach activity of Me$_3$TACN.

On the other hand, introduction of $Mn_2O_3$ begins to exhibit a positive effect on bleach activity at relatively larger amounts.

The influences of non-manganese water-insoluble compounds of other metals on the bleach activity of Me$_3$TACN are summarised in Table 2.

TABLE 2

Performance of other insoluble metal oxides

| Example | Catalyst | Mole Ratio (M:Me$_3$TACN) | ΔR |
|---|---|---|---|
| L | $H_2O_2$[a] | | 5.4 |
| M | Me$_3$TACN[b] | | 10.9 |
| N | $MnO_2$ + Me$_3$TACN | 25:1 | 14.2 |
| O | $Fe_2O_3$ + Me$_3$TACN | 25:1 | 10.3 |
| P | $Fe_3O_4$ + Me$_3$TACN | 25:1 | 10.3 |
| Q | $Fe(OH)_3$ + Me$_3$TACN | 25:1 | 10.2 |
| R | $Cu_2O$ + Me$_3$TACN | 25:1 | 9.5 |
| S | CuO + Me$_3$TACN | 25:1 | 10.6 |
| T | $Cu(OH)_2$ + Me$_3$TACN | 25:1 | 10.4 |
| U | $CeO_2$ + Me$_3$TACN | 11:1 | 10.7 |
| V | $CeO_2$ + Me$_3$TACN | 21:1 | 10.9 |

[a]Concentration 8.6 × 10$^{-3}$ mol/l
[b]Concentration 5.0 × 10$^{-6}$ mol/l

The data in Table 2 indicate that $Fe_2O_3$, $Fe_3O_4$, $Fe(OH)_3$, $Cu_2O$, CuO, $Cu(OH)_2$ and $CeO_2$ do not give enhanced bleaching activity with Me$_3$TACN.

EXAMPLE 7–9
Evaluation in Detergent Compositions
Base Formulation—Example W

|  | wt % |
|---|---|
| LAS [1] | 16.8 |
| STPP [2] | 18.0 |
| Soda Ash | 18.0 |
| Sodium Silicate | 8.0 |
| Sodium Sulphate | 30.0 |
| Minors & Water | balance |

Raw Materials
1. Linear alkylbenzene sulphonate having an average of . . . carbon atoms in the alkyl chain.
2. Sodium tripolyphosphate Two control Formulations (Examples X and Y) were prepared by adding to the base formulation of Example W as follows:

|  | g/l | |
|---|---|---|
|  | Example X | Example Y |
| Formulation of Example W | 4 | 4 |
| NaBO$_3$ H$_2$O | 0.86 | 0.86 |
| Me$_3$TACN | — | 0.00086 |

Composition Examples 7–9 according to the present invention, using the base formulation of Example W were also prepared thus:

|  | g/l | | |
|---|---|---|---|
|  | Example 7 | Example 8 | Example 9 |
| Formulation of Example W | 4 | 4 | 4 |
| NaBO$_3$ H$_2$O | 0.86 | 0.86 | 0.86 |
| Me$_3$TACN | 0.00086 | 0.00086 | 0.00086 |
| MnO$_2$ | 0.0109 | 0.0218 | 0.109 |

The following reflectance values (ΔR) were obtained:

TABLE 3
Performance of Examples of the Invention

| Example | ΔR |
|---|---|
| W | 3.3 |
| X | 6.7 |
| Y | 6.6 |
| 7 | 8.6 |
| 8 | 9.4 |
| 9 | 8.0 |

The data in Table 3 demonstrate that the addition of manganese dioxide also enhances the bleach activity in base detergent formulation W.

What is claimed is:

1. A bleach and/or oxidation catalyst system comprising in combination, a macrocyclic organic ligand of formula (I):

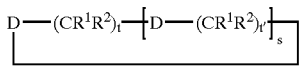

(I)

wherein R$^1$ and R$^2$ can each independently be absent, H, alkyl or aryl, optionally substituted; t and t' are each independent integers from 2–3; each D can independently be N, NR$^3$, PR$^3$, O or S, wherein each R$^3$ is independently H, alkyl or aryl, optionally substituted by one or more suitable substituents such as C$_{1-4}$ alkyl groups, or is a bridging group such as C$_{1-6}$ alkylene, either to another R$^3$ group in the same macrocycle or to another independently defined macrocycle or to another independently defined macrocyclic ligand of formula (I), wherein any bridging group optionally contains an optionally substituted heteroatom such as nitrogen; and s is an integer from 2–5; and a water-insoluble manganese compound.

2. A catalyst system according to claim 1, wherein t and t' are independently 2 or 3 and D is NR.

3. A catalyst system according to claim 2, wherein s is 2.

4. A catalyst system according to claim 3, wherein t and t' are both 2.

5. A catalyst system according to claim 1, wherein the ligand of formula (I) is 1,4,7-trimethyl-1,4,7-triazacyclononane.

6. A catalyst system according to claim 1, wherein the ligand of formula (I) has the formula:

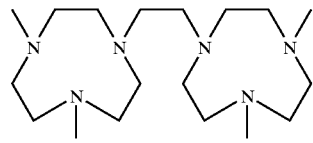

7. A catalyst system according to claim 1, wherein the manganese compound has a solubility of no more than 10 g/l at 25° C.

8. A catalyst system according to claim 1, wherein the manganese compound comprises hydr(oxide), sulphide, carbonate, oxalate and/or phosphate anions.

9. A catalyst system according to claim 1, wherein the manganese compound comprises a manganese oxide.

10. A compound according to claim 9, wherein the manganese oxide is selected from Mn$_2$O$_3$, Mn$_3$O$_4$ and/or MnO$_2$.

11. A compound according to claim 1, wherein the manganese in the manganese compound is in the II, III or IV oxidation state.

12. A catalyst system according to claim 1, wherein the weight ratio of the ligand of formula (I) to the manganese compound is from 1:0.32 to 1:160.

13. A bleaching composition comprising a catalyst system according to claim 1 and a peroxygen bleach or peroxygen bleach system.

14. A bleaching or cleaning process employing a composition according to claim 5, comprising treating a substrate to be bleached with an aqueous bleaching solution or dispersion containing said composition, wherein manganese is present in the solution or dispersion in an amount of from 0.001 ppm or 100 ppm.

* * * * *